Oct. 15, 1963 A. R. PUCCINELLI 3,107,072
METHOD OF AND APPARATUS FOR ASSURING THE SUPPLY OF
FUEL TO AN AIRCRAFT ENGINE DURING FLIGHT
Filed Sept. 18, 1961 2 Sheets-Sheet 1

INVENTOR.
Alfred R. Puccinelli
BY Charles A. Morton
ATTORNEY

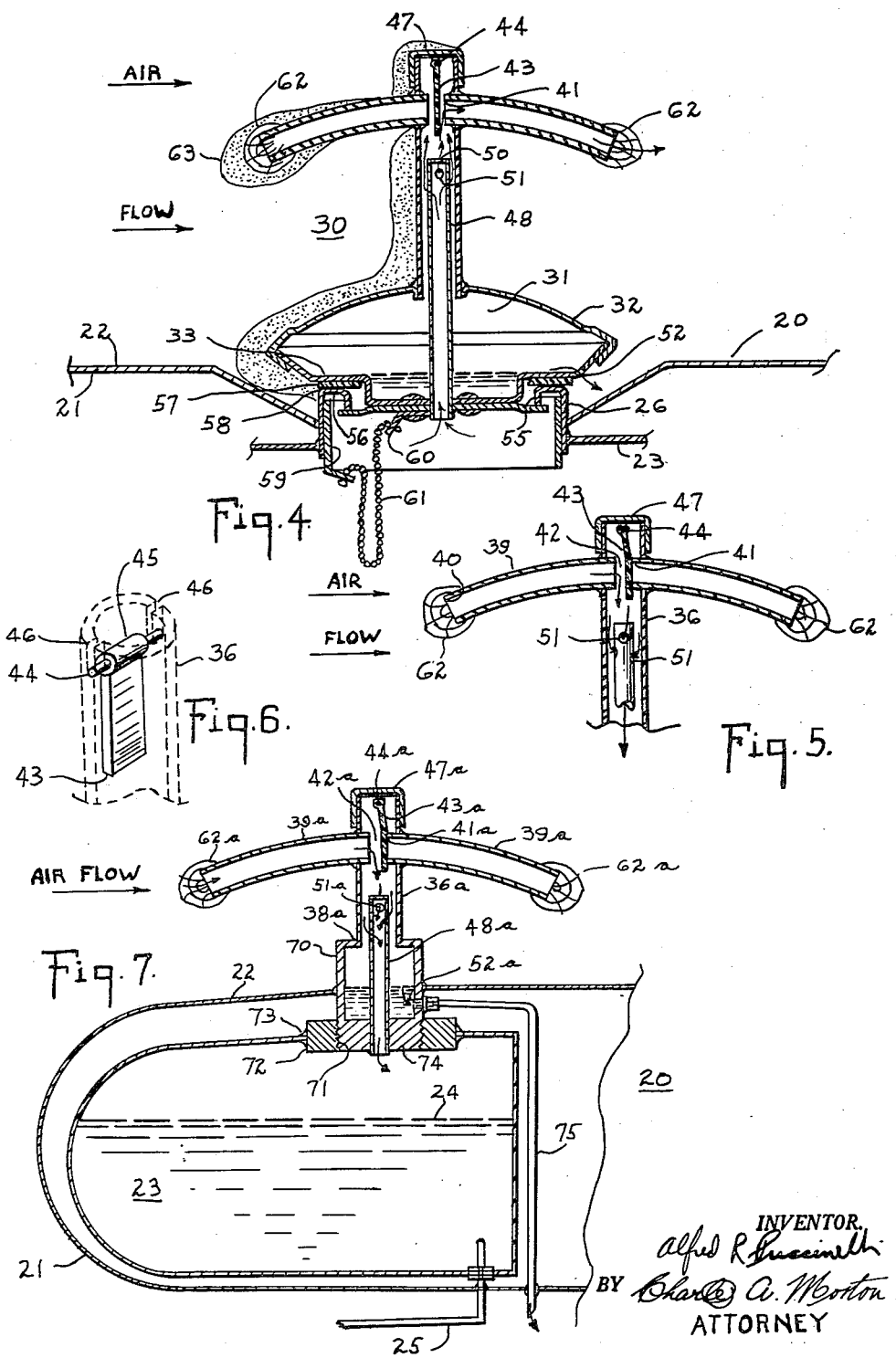

though the gravity feed intake pipe 25 (FIG. 7). The
United States Patent Office 3,107,072
Patented Oct. 15, 1963

3,107,072
METHOD OF AND APPARATUS FOR ASSURING THE SUPPLY OF FUEL TO AN AIRCRAFT ENGINE DURING FLIGHT
Alfred R. Puccinelli, 36 Bay Drive E., Huntington, N.Y.
Filed Sept. 18, 1961, Ser. No. 138,955
11 Claims. (Cl. 244—135)

This invention relates to aircraft engine gravity-feed wing fuel tank supply systems, and to a method of, and apparatus for, assuring the uninterrupted supply of fuel when fed by gravity from a wing fuel tank to the engine of an aircraft in flight. This application is a continuation in part of my copending application, Serial No. 15,868, filed March 18, 1960, now abandoned.

Failing a continuous fuel supply an aircraft engine will stall for lack of fuel and imperil the safety of all on board. When an airplane employs a gravity fed fuel system without a fuel pump, the risk of failure of the fuel feed in flight is a serious problem, particularly when ice begins to form on the wings of the airplane.

Aircraft gravity-feed wing fuel tank vent caps (or tank filler caps) are usually located substantially flush with the upper surface of the aircraft wing, and when the aircraft is in flight the vent cap is positioned in the layer of turbulent air which flows close to the surface of the wing and is of a negative pressure relative to atmospheric pressure. Overlying this layer of air of negative pressure is a dynamic air stream flowing above the wing at high speed and at positive pressure. The air of negative pressure which surrounds the vent cap creates negative pressure within the vent cap chamber and in the fuel tank, thus impairing the gravity flow of the fuel to the aircraft engine. Moreover when weather conditions are such that ice forms upon the wings of the airplane, the vent cap becomes coated with ice, thus closing the vent hole in the vent cap and shutting off ventilation above the fuel in the fuel tank thereby first retarding, and ultimately arresting, the gravity flow of the fuel.

One object of this invention is a method of assuring the uninterrupted supply of fuel to an aircraft engine from a gravity-feed wing fuel tank system.

Another object is a gravity-feed aircraft wing fuel tank system which assures an adequate supply of fuel to the engine under all weather conditions.

Another object is to assure adequate air pressure in gravity-feed wing fuel tanks of an airplane both in flight and when on the ground ready for take-off.

Another object is a gravity-feed aircraft fuel system which assures an adequate supply of fuel to the airplane engine under wing-icing conditions.

Another object is a gravity-feed fuel system for airplanes which traps rain water, and water of condensation, prevents the entry of water itno the fuel tank, and scavenges the trapped water under positive pressure.

Another object is an automatic change-over device which provides auxiliary means for continuing an adequate supply of fuel to the aircraft engine when the primary supply means fails to function.

Another object is a vent cap which can be installed upon a fuel tank as a replacement for the conventional filler cap now in use, and which is adapted to pressurize the fuel tank at positive pressure when the airplane is in flight.

Another object is to facilitate visual check up of the vent cap prior to take-off.

Another object is to eliminate fuel tank over flow, and the hazards incident thereto.

Another object is a fuel tank vent cap which can be locked upon the fuel tank in either one of two positions, and which when so locked is automatically set in the line-of-flight of the airplane.

Another object is the elimination of fuel system failure due to icing, particularly in airplanes which are equipped with a gravity-feed fuel system operating without a fuel pump.

Another object under icing conditions, is to rapidly build up icing externally of the fuel tank air-intake, and prevent ice from forming within the venting device.

Another object is a vent cap for a gravity-feed wing fuel tank, of but few and simple parts, which can be mass produced, is inexpensive to manufacture, which can be quickly installed in the airplane's line-of-flight, and which is very efficient and durable in use.

Other objects will appear from the detailed description.

In the drawing consisting of seven figures, numbered FIGS. 1 to 7, inclusive:

FIG. 4 is a vertical cross sectional view of the device of FIG. 1 installed upon an airplane in line-of-flight position, with the airplane and its wing fuel tank partially broken away.

FIG. 5 is a fragmentary cross sectional view showing the position of the valve mechanism under normal flying conditions.

FIG. 6 is a perspective view of the valve, and of the support therefor shown in phantom; and FIG. 7 is a vertical cross sectional view of a modified form of my invention as embodied in a gravity-feed system having the fuel tanks installed in the wings of an airplane of which only fragments are shown.

Like reference characters designate corresponding parts throughout the several figures of the drawing.

Figure 1:
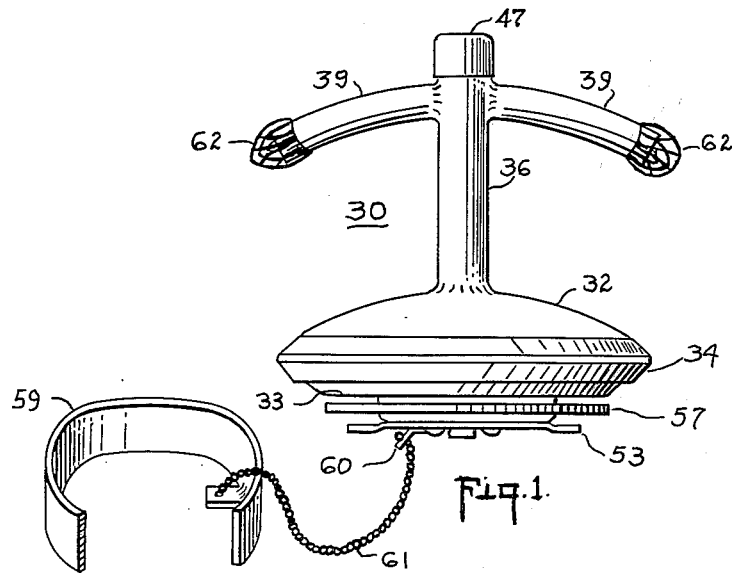
FIG. 1 is a side elevation of one embodiment of my invention as applied to a replacement for a conventional fuel tank filler cap.

When an airplane 20 (FIG. 7) is in flight, the airstream which flows over the wing 21 close to its upper surface 22, is said to be in a turbulent state and to create a zone of negative air pressure (pressure below atmospheric pressure), as opposed to or distinguished from the positive pressure of the stream of dynamic air which flows past the wings of the aircraft at a somewhat higher level which is indicated in the drawing (FIGS. 4 and 5) by the arrows designated "Air" and "Flow." As best shown in FIGS. 4 and 7, a fuel tank 23 may be installed inside each wing 21 of the aircraft 20, and said tanks, of which only one is shown in FIG. 7, may form a part of a gravity-feed wing-tank fuel system which supplies the gasolene fuel 24 to the carburetor (not shown) through the gravity feed intake pipe 25 (FIG. 7). The filler neck 26 for the fuel tank 23 (FIG. 4) protrudes through the wing 21 of the airplane 20, and in conventional practice said filler neck is closed by a lock-on vented filler cap (not shown), which cap has a vent hole passing through its underside to vent the fuel tank to atmosphere. The vent hole in the said tank filler cap is positioned very close to the upper surface 22 of the wing 21 and within the negative pressure zone created by the air stream flowing over the wing surface 22. Under these conditions, air may be sucked from the fuel tank through the vent hole in the tank filler cap, and if icing conditions are encountered, the vent hole in the tank filler cap is sealed shut by the ice and cannot draw air, hence as the gasoline in the fuel tank is consumed by the aircraft engine, the pressure inside the fuel tank drops, and eventually offsets the influence of gravity and thus impedes the free flow of gasoline into the carburetor, causing the engine to stall and forcing the engine to a crash landing.

Applicant's method and apparatus eliminates these dangers and defects, by providing a suitable air intake passage for admitting air to the fuel tank, which passage is elevated far enough above the upper surface of the wing 21 to position said passage in the stream of dynamic air with the entrance to said passage facing directly into the line-of-flight of the aircraft, so that, whenever the aircraft is in flight, air at positive (or above atmospheric) pressure, is rammed into said air intake passage thus subjecting the fuel 24 in the fuel tank 23 (FIG. 7) to positive pressure and augmenting the gravity feed of the gasolene fuel 24 from the wing fuel tanks 23, through the common intake pipe 25 (FIG. 7) to the carburetor (not shown). This is accomplished by combining a vent cap embodying these novel features of construction with the gravity-feed fuel tank 23, or by building these novel features of construction into a fitting forming a part of the fuel tank itself (FIG. 7).

Figure 2:
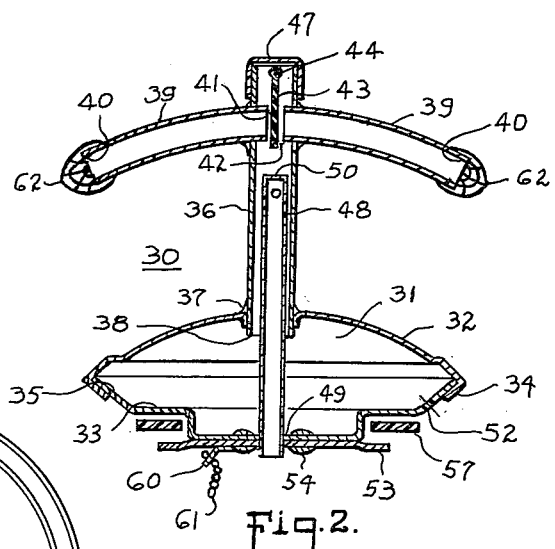
FIG. 2 is a vertical cross sectional view of a central section of the device of FIG. 1, with some of the parts thereof omitted.
Figure 3:
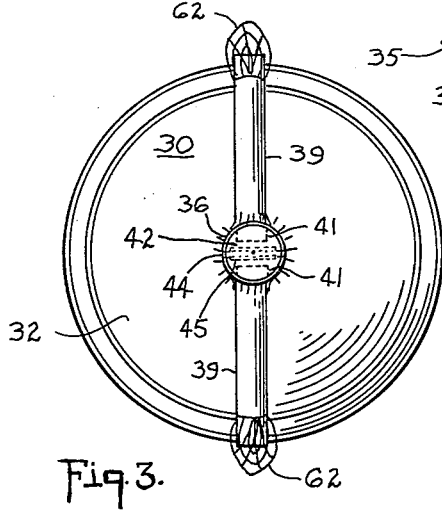
FIG. 3 is a top plan view of the device of FIG. 1 with certain parts broken away and with other parts thereof indicated in dotted outline.

Referring more particularly to FIGS. 1 to 4, the vent cap 30 contains a chamber 31 formed between a dome 32 and its base plate 33 by an inwardly bent annular skirt 34 which overhangs and overlaps the outwardly flared flange 35 of the base plate 33. The skirt 34 may be crimped around the flange 35 in any suitable manner, and is sealed thereto as with a soldered joint (FIG. 2). An outer tube 36 extends through the centre of the dome 32 in both directions, and is joined to the wall of the dome by a ring of solder 37, or by welding. The lower end 38 of outer tube 36 extends into, and so connects with, the chamber 31. Two diametrically oppositely disposed air intake tubes 39, 39 are mounted upon, and connected with, the tube 36 adjacent the upper end thereof. These air tubes 39, 39 extend radially outwards from within the tube 36, and curve downwardly and outwardly from the tube 36, so that the crown of the lower wall of each air intake tube 39 is above the level of the roof of its mouth 40, thus tending to effect a reverse flow of any water which may enter either air intake tube 39 through its mouth 40, when the airplane 20 is in flight. The inner ends 41, 41 of the air intake tubes 39, 39 extend radially inwards through the wall of the tube 36 but are separated from each other in oppositely spaced relation to provide an air gap 42 between them wherein a resilient membrane 43 is swingably supported at 44. The membrane 43 is composed of a material of low thermal conductivity, and which is flexible and resilient. Experience has shown that a membrane composed of synthetic rubber gives good results.

The membrane 43 may be swingably supported in any preferred manner. For example, the membrane may be provided with a thickened shoulder 45 having a central opening extending through said shoulder coaxially therewith to receive a pivot pin whereon said membrane swings freely (FIG. 6). The upper end of outer tube 36 is closed by the cap 47 which also retains the pivot pin 44 seated in the notches 46, 46 formed in the upper end of the outer tube 36 as shown in phantom in FIG. 6. When at rest, the membrane 43 is suspended in the air gap 42 midway between the spaced inner ends 41, 41 of the air intake tubes 39, 39 and when so suspended each of the air intake tubes is in free communication with the outer tube 36 and via said tube with the chamber 31 (FIG. 2).

Mounted within and coaxial with the outer tube 36, is a vented stand pipe 48, which extends through the base plate 33 of the vent cap 30 to communicate with the filler neck 26 of the fuel tank 23 (FIG. 4). A soldered joint 49 between the lower end of the stand pipe 48 and the base plate 33 seals off all communication between the base plate 33 and the filler neck 26 of the fuel tank 23 and prevents water or other liquid collected in the chamber 31 from passing into the fuel tank 23 by way of the base plate 33. The upper end of the stand pipe 48 terminates below the free end of the membrane 43, and said upper end may be sealed shut at 50 (FIGS. 2 and 4) to prevent any water which may collect at the inner end 41 of either air inlet tube 39 from dripping into the stand pipe 48 and from flowing through said stand pipe into the fuel tank 23. The stand pipe 48 is provided with a plurality of air holes 51 to complete two air passages. Each of the said air passages extends from the mouth 40 of one of said air intake tubes 39, through said tube 39 and the outer tube 36, through the air holes 51, 51 into the stand pipe 48, and through said stand pipe 48 into the fuel tank 23. Thus the membrane 43 will swing responsive to any difference in pressure applied to the air intake tubes 39, 39 to close off the tube 39 connecting with the source of lower pressure and establish a passage between the source of higher pressure and the fuel tank 23. Conversely, when the pressure applied to each tube 39 is the same, the membrane will assume the midway position (FIG. 2).

A drain hole 52 passes through the flared flange 35 of the base plate 33, to scavenge any water which may collect in the chamber 31. A lock bar 53 is riveted at 54, 54 across the base plate 33 and is sized to pass through notches (not shown) formed in the interior wall of the filler neck 26, and engage against the bottom edge face 55 of the inverted U-shaped collar 56 of the filler neck 26 to clamp the gasket 57 between the annular flange of the base plate 33 and the shoulder 58 of the filler neck 26 (FIG. 4) and form a leakproof seal around the entrance opening into the fuel tank. The notches in the filler neck 26 which admit the lock bar 53 of the vent cap 30 are so disposed relative to the lock bar 53 that when the vent cap 30 is turned to locked position upon the filler neck 26 (FIG. 4), the air inlet tubes 39, 39 are aligned fore and aft, or in line with the line-of-flight of the aircraft 20, in which position the mouth 40 of the forward air tube 39 always faces to the front and into the dynamic air stream which is flowing into the mouth 40 of the air inlet tube 39 at positive air pressure, thus causing said forward, or leading, air inlet tube to function as a ram tube.

The mouth 40 of each tube 39 is screened by a woven wire screen 62, so that when the aircraft encounters icing conditions while in flight the screen 62 of the ram air tube 39 will ice up rapidly as at 63 (FIG. 4) and thus completely seal off the mouth 40 of the ram air tube 39 before ice has time to form inside the ram air tube (FIG. 4). Ice does not form upon the screen 62 of the rear, or trailing, air inlet tube 39. The screens 62, 62 also prevent insects from entering or nesting in the air passages in the tubes 39, 39 and 36.

To prevent the vent cap 30 from being mislaid after it has been detached from the filler neck 26, a snap ring 59 is secured to a clip 60 which is rivetted by one of the rivets 54 to the lock bar 53 of the base plate 33 of the cap 30 by a flexible chain 61, and said snap ring 59 is inserted in the annular channel formed in the inverted U-shaped collar 56 to lock the snap ring 59 in the filler neck 26 of the fuel tank 23, thus chaining the vent cap 30 to its associated fuel tank.

When the vent cap 30 is locked upon the filler neck 26, the air tubes 39, 39 are positioned fore and aft relative to the airplane 20, or in the line-of-flight thereof, and this line-of-flight setting of the vent cap is easily checked at a distance before take-off.

The camber of an airplane wing is such that when the airplane is in flight, the airstream close to the upper surface of the wing is at negative, or below atmospheric, pressure. The length of the outer tube 36, and the downward curvature of the air inlet tubes mounted on said outer tube 36, is accordingly so proportioned, that when the vent cap 30 is locked upon the filler neck 26 in line-of-flight position, the air inlet tubes 39, 39 are elevated far enough above the upper surface 22 of the wing 21, to position said tubes 39, 39 in the path of the dynamic airstream of positive air pressure which overlies the airstream of negative pressure closer to the upper surface of the wing 21. The leading, or ram air tube, 39, is now subjected to the positive pressure of the dynamic airstream, and this pressure exceeds the pressure in the trailing, or rear, air tube 39. This difference in air pressures acting upon the resilient membrane 43, causes said membrane to swing rearwardly through the air gap 42 about its pivotal support 44 to the position shown in FIG. 5 to seal off the passage from the rear air tube and establish a through air passage at positive pressure from the mouth 40 of the ram air tube 39, through the open valve 43 and its air gap 42, through the outer tube 36, through the air holes 51 and the stand pipe 48, into the fuel tank 23, thus increasing the flow of fuel 24 under positive air pressure into the carburetor intake pipe 25.

Should the aircraft 20 encounter icing conditions while in flight, the fine mesh screen 62 which covers the mouth 40 of the leading, or ram, air tube 39, will ice up rapidly and seal the mouth of said tube before ice has time to form inside the ram tube 39. The air pressure inside the ram tube now decreases until the air pressure inside the outer tube 36 is equalized, whereupon the membrane 43 returns to a position midway between the inner ends 41, 41 of both air tubes 39, 39 to establish an auxiliary vent between the fuel tank 23 and the trailing or rear air tube 39, that is, through the air tube 39 facing in the opposite direction, or at an angle of 180 degrees, from the line-of-flight of the aircraft. Thus the auxiliary air vent, or air passage, increases in-flight protection by automatically venting the fuel tank 23 through the rear air inlet tube 39, whenever the ram air tube ices up in flight.

The membrane 43 is composed of synthetic rubber which is chemically inert to gasoline and will not deteriorate from the effects thereof. Moreover the membrane 43 discourages condensation of moisture upon its surface thus assuring freedom of movement of the membrane under icing conditions. Synthetic rubber and other compositions of low thermal conductivity, react much more slowly to freezing temperatures than metals do, hence, under icing conditions, the membrane is not affected by a fall in temperature as quickly as is the close mesh metal screen 62. Ice accordingly builds up rapidly upon screen 62 and seals off the mouth 40 of ram air tube 39 before the falling temperature affects the mobility of the membrane 43 which accordingly remains free to return to midway position (FIG. 4). Moreover should the membrane 43 fail to resume its midway position, then, as the fuel 24 is consumed, negative pressure will build up in the fuel tank 23, and the resulting difference in pressure upon the opposite sides of the membrane 43, and its inherent resiliency, will induce the membrane to resume its midway position between the inner ends 41, 41 of the air inlet tubes 39, 39.

Other materials of low thermal conductivity, including resilient plastic materials of low thermal conductivity, may be substituted for synthetic rubber in the membrane 43. Instead of pivoting the shoulder 45 of the membrane 43 upon a pivot pin (FIG. 6), the membrane and its enlarged shoulder 45, may be molded in one piece, and the shoulder 45 may be shaped and sized to nest between the sides of the notches 46 of the outer tube 36, and to utilize the inherent resiliency of the plastic material to return the membrane 43 to midway position after flexing pressure has been removed from the membrane.

The radius of curvature of the air inlet tubes 39, 39 is such that when the aircraft is upon the ground, rain entering the mouth 40 of either tube 39, cannot flow uphill over the crown of the curved lower wall of the tube to enter the tube 36. Moreover any water which might succeed in entering the tube 36 would merely collect in the chamber 31 of the vent cap 30 until the water reached the level of the drain hole 52, whereupon any additional water would scavenge over the wing 21. The sealed over upper end 50 of the stand pipe 48 prevents any water which may succeed in reaching the inner end 41 of either of the air inlet tubes 39, from entering the fuel tank through the stand pipe 48.

When a gravity-feed wing fuel tank equipped with a conventional tank filler cap is filled above its indicated level, the negative pressure in the region of the wing surface, sucks gasoline out of the fuel tank through the vent hole in said filler cap and floods the surface of the wing, thus creating a fire hazard. Applicant's invention eliminates this trouble because it subjects the filler neck to positive pressure so that the gasoline is not sucked up into the stand pipe 48 and cannot escape from the fuel tank.

In the modified form shown in FIG. 7, the lower end 38a of the outer tube 36a is joined to a chambered plug 70. The plug 70 is male threaded at 71 to screw into an internally threaded ring 72 which is welded at 73 in an opening in the wall of the fuel tank 23 of a wing-feed fuel system of the gravity type. The stand pipe 48a passes through the base 74 of the plug 70 into the fuel tank 23, thus venting the fuel tank through the air inlet tubes 39a, 39a into the stream of dynamic air superposed above the aircraft 20, in the manner previously described. The screens 62a, 62a function under icing conditions, and to exclude insects from the air tubes 39a, 39a and from the outer tube 36a, all as previously described. The membrane 43a is swingably mounted in the air gap 42a between the inner ends 41a, 41a of the air inlet tubes 39a, 39a and function in the maner previously described. The water which collects in the chambered plug 70 escapes through the drain pipe 75, from the drain hole 52a. Positive air pressure entering the fuel tank 23 by way of stand pipe 48a, augments the action of gravity to assure the free flow of fuel through the carburetor intake pipe to the airplane engine.

Moisture in the air which enters either of the air intake tubes 39, 39 or 39a, 39a, may condense during passage of the air through said air through air intake tubes and into the outer tube 36. Any such water of condensation collecting in the said tubes will drain into the chamber 31 (FIG. 4), or into the chamber of the chambered plug 70 (FIG. 7), and will be scavenged through the drain hole 52 (FIG. 4), or 52a (FIG. 7), in the manner previously described.

The drain hole 52 (52a), is in reality a bleed port. It is purposely made appreciably smaller in cross section than either the air gap 42, the ram air tube 39, or the mouth 40 of the ram air tube 39, so that the air which bleeds through said bleed port 52 (52a) will not appreciably reduce the positive pressure in the chamber 33 or in the inner tube or standpipe 48 created by the ram air supplied through the ram air tube 39.

What is claimed is:

1. In a gravity-feed fuel tank fuel-supply system for supplying fuel to the engine of a winged aircraft and in combination, an aircraft engine having a fuel intake manifold, a fuel tank positioned in a wing of said aircraft, a fuel supply line interconnecting said fuel tank and said engine, an air vent mounted in the top of said fuel tank for subjecting the fuel in said fuel tank to air pressure, said vent including a chambered housing mounted upon said fuel tank, said chambered housing constituting a water trap, an outer tube supported upon said chambered housing, said outer tube having a lower end and an upper end, the lower end of said outer tube connecting with said water trap, two diametrically oppositely disposed air intake tubes mounted upon and connecting with said outer tube adjacent the upper end thereof, the inner ends of said intake tubes ending within said outer tube in spaced relation to each other, said air intake tubes extending radially outwards from said outer tube and curving downwardly and outwardly therefrom, each of said tubes being open at its outer end to define a mouth for the intake of air into its associated air intake tube, the mouth of one of said air intake tubes fronting at all times into the line of flight of said aircraft when in flight, an inner tube mounted within said outer tube and extending coaxially therewith therein, said inner tube having a lower end and an upper end, the lower end of said inner tube extending downwardly through said water trap and terminating within and connecting with the interior of said fuel tank, the upper end of said inner tube terminating within said outer tube below the connections between said outer tube and said air intake tubes, a membrane swingably supported from its upper end in the upper end of said outer tube and above its connections with said air intake tubes, the upper end of said outer tube being closed and anchoring the support for said membrane, said membrane being operable responsive to the difference in pressure between the pressures of the air in said air intake tubes to close the entrance to the intake tube which is subjected to the air of lower pressure and to simultaneously establish a vent-passage connection between the intake tube which is subjected to the air of higher pressure and said fuel tank, a bleed port connecting said water trap to atmosphere, said bleed port being effective to scavenge water from said water trap to atmosphere, and said bleed port being appreciably smaller in cross section than said air intake tubes and the mouths thereof so as not to appreciably reduce the air pressure in said outer tube.

2. The invention as defined in claim 1 wherein the membrane is composed of a flexible resilient material of low thermal conductivity.

3. The invention as defined in claim 1 having a membrane composed of synthetic rubber.

4. In a valved vent cap useful for venting a gravity-feed wing fuel tank of an airplane through a filler neck forming a part of said fuel tank and in combination a vent cap, said vent cap including a base plate, said base plate having an annular flange sized to register with and to seal the filler neck of a fuel tank, a dome-shaped upper plate overlying and overlapping said annular flange and in conjunction therewith defining a water trap, a bleed port extending through said base plate and connecting with said water trap for bleeding said water trap to atmosphere, an outer tube, said tube being open at both ends, one end of said tube being supported in the dome of said upper plate and connecting with said water trap, said tube projecting upwardly from said upper plate in an upstanding position, an inner tube mounted within said outer tube and coaxial therewith, said inner tube having a lower end extending through said water trap and through said base plate to connect with a filler neck of a fuel tank, said inner tube having a closed upper end terminating below the open upper end of said outer tube, said inner tube having a series of air holes extending through the side wall of said tube below its closed upper end and above the bleed port in said base plate, said inner tube and said air holes in conjunction thereby defining an air vent passage for a fuel tank whenever the base plate of said cap is in sealing registry with the filler neck of such fuel tank, and the closed upper end of said inner tube preventing water from entering said air vent passage.

5. In a vent cap useful for venting a gravity-feed wing fuel tank of an airplane through a filler neck opening in such tank and in combination, a base plate adapted to be detachably secured to a filler neck opening of a fuel tank, a dome-shaped upper plate joined to and superposed upon said base plate and in conjunction therewith constituting a dome-topped chamber, an outer tube having an open lower end, an inner tube having an open lower end, an aperture extending through said upper plate sized to receive said open lower end of said outer tube and to support said outer tube in said upper plate and in an upright position thereabove, an aperture extending through said base plate sized to receive said open lower end of said inner tube and to support said inner tube in said base plate and in an upright position thereabove, said inner tube extending upwardly through said dome shaped chamber, said apertures in said plates being coaxially aligned to bring said inner tube into coaxial alignment with and within said outer tube and in spaced relation to the inner wall thereof to form an annular passage extending between said inner tube and said outer tube for diverting water entering said vent cap into said dome-shaped chamber to trap such water in said chamber, a bleed port extending through the wall of said chamber to scavenge water trapped in said chamber to atmosphere, said inner tube being closed at its upper end to prevent water in said outer tube from entering said inner tube, said outer tube extending upwardly and beyond the closed upper end of said inner tube, said outer tube also being closed at its upper end, an air tube supported upon said outer tube adjacent its closed upper end and above the level of the closed upper end of said inner tube, said air tube opening into said outer tube and curving radially outwardly and downwardly therefrom, the outer end of said air tube having an open mouth for fronting into the line-of-flight of an airplane and when so fronting converting said air tube into a ram air tube, and said inner tube having air holes passing through the side wall thereof above said bleed port to complete a vented air passage comprising said air tube said outer tube said inner tube and the air holes therein for interconnecting the mouth of said air tube and a filler neck opening of a fuel tank.

6. A valved vent cap useful for venting a wing fuel tank of an airplane by utilizing the positive pressure of the stream of dynamic air generated by such airplane when in flight comprising a casing member extending sufficiently far above said wing surface to be in the area of positive pressure, said casing member including two air inlet branches and an outlet branch common to both of said air inlet branches, said air inlet branches being joined to said outlet branch in diametrically oppositely disposed and spaced relation to define an air gap therebetween, said casing member being adapted to be secured upon a wing fuel tank of an airplane to support said outlet branch in an upright position and to align said air inlet branches in fore and aft positions relative to said airplane, a flexible resilient membrane, said membrane being suspended from said casing for movement in said air gap toward and away from said air inlet branches, said membranes having low thermal conductivity and being movable in said air gap responsive to positive air pressure of air entering either of said air inlet branches to divert said air of positive pressure into said outlet branch, said air inlet branches curving radially outwardly and downwardly in diametrically opposite directions from their junction with said outlet branch so that when said casing member is secured upon a wing tank of an airplane so as to support said outlet branch in an upright position thereabove and with said air inlet branches aligned fore and aft relative to said airplane the air inlets of said air inlet branches will face directly into and away from an air stream of dynamic air generated by said airplane in flight, and the air inlet branch which faces directly into such stream of dynamic air projecting a part of said stream of dynamic air at positive air pressure against said membrane.

7. In a valved vent cap useful when secured upon a wing fuel tank of an airplane to vent such fuel tank at the positive pressure of the stream of dynamic air which is generated by such airplane while in flight, and in combination a casing member extending sufficiently far above said wing surface to be in the area of positive pressure, said casing member including two air inlet branches and an outlet branch common to both of said air inlet branches, said air inlet branches being joined to said outlet branch adjacent its upper end and in diametrically oppositely disposed and spaced relation and with an air gap therebetween, each of said air inlet branches being open at its outer extremity to define an open mouth for admitting air into the said air inlet branch, said casing member being adapted to be so secured upon a wing fuel tank of an airplane as to support said outlet branch in an upright position thereon align said air inlet branches so that their open mouths face directly forward and aft relative to such airplane and connect said air inlet branches and said common outlet branch with the interior of such fuel tank to establish a vent passage for such fuel tank through either mouth of either air inlet branch, a flexible resilient membrane of low thermal conductivity suspended in said casing and positioned in said air gap midway between said air inlet branches to establish vent passages between said fuel tank and both of said air inlet branches, and said membrane being operable responsive to air at positive air pressure directed against said membrane through said air inlet branch facing forward to move through said air gap from its midway position towards the air inlet branch facing aft and away from the air inlet branch facing forward to close off the vent passage to the air inlet branch facing aft and to divert said air at positive air pressure through the vent passage between the mouth of the air inlet branch facing forward and such fuel tank thereby subjecting fuel in such fuel tank to the air pressure of the dynamic air generated by the airplane in flight.

8. The invention as defined in claim 7 having a membrane composed of synthetic rubber.

9. The invention as defined in claim 7 characterized in this, that when the mouth of the air inlet branch facing forward is closed by the formation of ice thereon said membrane returns to its midway position to reopen the vent passage between the mouth of the air inlet branch facing aft and the fuel tank.

10. The invention as defined in claim 7 wherein the mouths of said air inlet branches are covered by wire mesh screens so that the screen covering the mouth of the air inlet tube facing forward will ice up rapidly under icing conditions before any ice has time to form within the air intake branches or upon the membrane thereby assuring return to midway position movement of the membrane when icing conditions render the air inlet branch facing forward inoperable.

11. A valve vent for a wing fuel tank of an airplane comprising a pair of air inlet means extending sufficiently above the upper surface of said wing to be in the area of positive pressure, one of said inlet means being faced directly into the line of flight, and the other of said inlet means being faced directly away from the line of flight and a pressure sensitive valve adapted to seal one of said inlets if negative pressure is applied to said one inlet.

References Cited in the file of this patent

UNITED STATES PATENTS

| | | |
|---|---|---|
| 1,435,331 | Pasco | Nov. 14, 1922 |
| 1,581,595 | Osborne | Apr. 20, 1926 |
| 1,784,067 | Holtson | Dec. 9, 1930 |
| 2,609,118 | Cattaneo | Sept. 2, 1952 |

FOREIGN PATENTS

| | | |
|---|---|---|
| 483,676 | Great Britain | Apr. 25, 1938 |